June 27, 1933.   R. S. ALLDRIDGE   1,916,131
CINEMATOGRAPH CAMERA
Filed Jan. 29, 1931

INVENTOR
R. S. Alldridge
BY
ATTORNEYS

Patented June 27, 1933

1,916,131

UNITED STATES PATENT OFFICE

REGINALD STRATTEN ALLDRIDGE, OF HARROW, ENGLAND, ASSIGNOR TO RAYCOL BRITISH CORPORATION LIMITED, OF LONDON, ENGLAND, A BRITISH COMPANY

CINEMATOGRAPH CAMERA

Application filed January 29, 1931, Serial No. 512,161, and in Great Britain August 9, 1930.

This invention relates to compound cinematograph lenses of the kind used in colour cinematography and comprising at least two lenses, arranged side by side within a single lens barrel and provided with inclined guide surfaces which cause the separation of the lenses to be varied as a consequence of the focussing movement, with the object of avoiding or minimizing parallax. Such a compound lens is described in the specification of United States Patent No. 1,773,021 and in this example the guide surfaces are conical surfaces combined with flat parallel side surfaces intended to prevent lateral movement of the lenses.

It has been found very difficult to make a compound lens of this kind in which the focussing movement (effected by a screw-threaded focussing sleeve) can be reversed during use without causing the images to move slightly out of register; the images remain in register while the lenses are moving continuously in one direction, for example while photographing an actor moving away from the camera, but if the movement is reversed, as for example when the actor turns and approaches the camera, there tends to be a momentary loss of correct register sufficient to cause false colour fringes in the projected image.

This difficulty is in part due to friction between the focussing-sleeve and the lens mounts, such friction being of course greatest when the abutting surfaces are stationary at the moment of reversal of the rotation of the sleeve, and it is the object of the present invention to minimize the difficulty by isolating the lens mounts from the torsion exerted by friction.

According to this invention an annulus is interposed between the focussing-sleeve and the lens mounts which annulus is guided independently of the guiding of the lens mounts, so that it can move parallel to the axes of the lenses but cannot rotate. Preferably a ball thrust bearing is provided between the focussing-sleeve and the annulus. The annulus may furthermore be biassed in a rotary sense by springs, sufficiently strong to overpower the tendency of the sleeve to rotate it, whereby any back-lash between it and the guiding means which hold it against rotation is permanently taken up.

Figure 1:
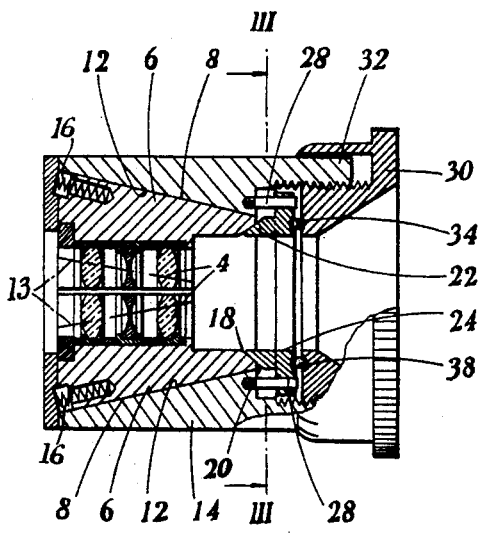
Figure 2:
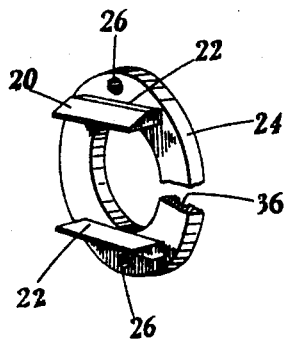
Figure 3:
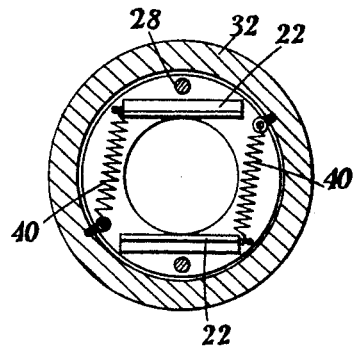

A construction according to this invention is illustrated by way of example in the accompanying drawing, in which Figure 1 is a side elevation in section of a compound lens provided with the improved focussing device, Figure 2 is a perspective view of a part thereof, and Figure 3 is a section on the line III—III in Figure 1.

The two lenses 4 are carried by mounts 6 having inclined guide-surfaces 8 co-operating with similarly inclined guide surfaces 12 within the lens barrel 14. These inclined surfaces may be conical, as in the patent specification already referred to, but they are preferably flat. The co-operating guide-surfaces 8 and 12 are supplemented by opposed guide-surfaces parallel thereto, indicated at 13, and more particularly described in the specification of co-pending application No. 512,162 filed January 29th, 1931. The guide surfaces constitute a means for constraining the lenses to move in paths converging towards one another in the forward direction, as will be apparent. The lens mounts 6 are urged by compression springs 16 towards the right, that is forwardly, and at their front ends they are formed with undercut inclined surfaces 18 engaged by corresponding flat inclined surfaces 20 formed on projections 22 on an annulus 24. This annulus is provided with two holes 26 oppositely disposed which fit two cylindrical pegs 28 fixed into the front of the lens barrel 14, the axes of the pegs being parallel to the axis of the barrel. The pegs are a good sliding fit in the holes, and therefore the annulus is free to move parallel to the axis of the barrel but cannot rotate in relation to the barrel.

A focussing sleeve 30 is screwed into an extension 32 of the barrel and may bear directly against the front side of the annulus. It is preferred, however, to interpose a ring of balls 34 seated in ball-races 36, 38 in the annulus and the focussing sleeve respectively. These balls not only secure easy operation of the focussing sleeve but they ensure that the annulus shall be subjected to a minimum of torque. Thus any tendency for the pegs 28 to bend or to wear excessively is reduced, and even if slackness should develop between the pegs and the holes 26 the tendency to move the mounts 6 sideways will be slight.

As a further precaution the annulus may be biassed by spring action in a rotary sense. This may be effected as shown in Figure 3 by tension springs 40 each attached at one end to the extremity of one of the projections 22 and at the other end to the interior of the barrel. The tension in these springs is made sufficient to overpower the torque transmitted by the balls 34, with the result that any backlash between the pegs 28 and the holes 26 is permanently taken up, thereby ensuring that no rotation of the annulus can take place.

The annulus may be guided by means other than the pegs 28 for example its periphery may be made non-circular and the interior of the extension 32 of the barrel correspondingly shaped.

I claim:—

1. A compound cinematograph objective comprising in combination at least two lenses having spaced parallel axes, mounts for said lenses, a lens barrel surrounding said lens mounts, means within said barrel constraining said lenses to move in paths converging towards one another in the forward direction, a screw-threaded focussing sleeve screwing within the lens barrel at one end thereof, an annulus interposed between said focussing sleeve and the ends of the lens mounts, guiding means for said annulus adapted to prevent rotation of the annulus but to permit it to move in a direction parallel to the axes of the lenses, and resilient means urging the lens mounts towards the focussing sleeve.

2. A compound cinematograph objective comprising in combination at least two lenses having spaced parallel axes, mounts for said lenses, a lens barrel surrounding said lens mounts, guides within said barrel adapted to guide each lens in a path inclined to the axes of the lenses and converging towards the axis of the lens barrel in the forward direction, a screw-threaded focussing sleeve screwing within the lens barrel at one end thereof, an annulus interposed between said focussing sleeve and the ends of the lens mounts, guiding means for said annulus adapted to prevent rotation of the annulus but to permit it to move in a direction parallel to the axes of the lenses, and resilient means urging the lens mounts towards the focussing sleeve.

3. A compound cinematograph objective comprising in combination at least two lenses having spaced parallel axes, mounts for said lenses, a lens barrel surrounding said lens mounts, means within said barrel constraining said lenses to move in paths converging towards one another in the forward direction, a screw-threaded focussing sleeve screwing within the lens barrel, an annulus interposed between said focussing sleeve and the ends of the lens mounts, guiding means for said annulus adapted to prevent rotation of the annulus but to permit it to move in a direction parallel to the axes of the lenses, a ring of anti-friction balls interposed between said focussing sleeve and said annulus, and resilient means urging the lens mounts towards the focussing sleeve.

4. A compound cinematograph objective comprising in combination at least two lenses having spaced parallel axes, mounts for said lenses, a lens barrel surrounding said lens mounts, means within said barrel constraining said lens mounts to move in paths converging towards one another in the forward direction, a screw-threaded focussing sleeve screwing within the lens barrel, an annulus interposed between the said focussing sleeve and the ends of the lens mounts, guiding means for said annulus adapted to prevent rotation of the annulus but to permit it to move in a direction parallel to the axes of the lenses, resilient means tending to rotate the annulus always in one direction, and resilient means urging the lens mounts towards the focussing sleeve.

5. A compound cinematograph objective comprising in combination at least two lenses having spaced parallel axes, mounts for said lenses, a lens barrel surrounding said lens mounts, means within said barrel constraining said lens mounts to move in paths converging towards one another in the forward direction, a screw-threaded focussing sleeve screwing within the lens barrel, an annulus interposed between said focussing sleeve and the ends of the lens mounts, guiding means for said annulus adapted to prevent rotation of the annulus but to permit it to move in a direction parallel to the axes of the lenses, resilient means tending to rotate the annulus always in one direction, a ring of anti-friction balls interposed between said focussing sleeve and said annulus, and resilient means urging the lens mounts towards the focussing sleeve.

6. A compound cinematograph objective comprising in combination at least two lenses having spaced parallel axes, mounts for said lenses, a lens barrel surrounding said lens mounts, guides within said barrel adapted to guide each lens in a path inclined to the axes of the lenses and converging towards the axis of the lens barrel in the forward direction, a screw-threaded focussing sleeve screwing within the lens barrel at one end thereof, an annulus interposed between said focussing sleeve and the ends of the lens mounts, said annulus having surfaces inclined with respect to the lens axes engaging corresponding surfaces on the lens mounts and adapted to urge said lens mounts radially outwards by pressure exerted between said surfaces in the axial direction, guiding means for said annulus adapted to prevent rotation of the annulus but to permit it to move in a direction parallel to the axes of the lenses, and resilient means urging the lens mounts towards the focussing sleeve.

7. A compound cinematograph objective comprising in combination at least two lenses having spaced parallel axes, mounts for said lenses, a lens barrel surrounding said lens mounts, guides within said barrel adapted to guide each lens in a path inclined to the axes of the lenses and converging towards the axis of the lens barrel in the forward direction, a screw-threaded focussing sleeve screwing within the lens barrel at one end thereof, an annulus interposed between said focussing sleeve and the ends of the lens mounts, said annulus having surfaces inclined with respect to the lens axes engaging corresponding surfaces on the lens mounts and adapted to urge said lens mounts radially outwards by pressure exerted between said surfaces in the axial direction, guiding means for said annulus adapted to prevent rotation of the annulus but to permit it to move in a direction parallel to the axes of the lenses, a ring of anti-friction balls interposed between said focussing sleeve and said annulus, and resilient means urging the lens mounts towards the focussing sleeve.

In witness whereof I hereunto subscribe my name this sixth day of January, A. D. 1931.

REGINALD STRATTEN ALLDRIDGE.